(12) United States Patent
Blake et al.

(10) Patent No.: US 12,524,483 B2
(45) Date of Patent: Jan. 13, 2026

(54) FAULT MONITORING IN A UTILITY SUPPLY NETWORK

(71) Applicant: SPATIALBUZZ LIMITED, Guildford (GB)

(72) Inventors: Andrew Blake, Guildford (GB); Michael Shannon, Redhill (GB); Christopher John Haslett, Burgh Heath (GB)

(73) Assignee: SPATIALBUZZ LIMITED, Guildford (GB)

( * ) Notice: Subject to any disclaimer, the term of this patent is extended or adjusted under 35 U.S.C. 154(b) by 0 days.

(21) Appl. No.: 18/302,527

(22) Filed: Apr. 18, 2023

(65) Prior Publication Data

US 2023/0385352 A1    Nov. 30, 2023

Related U.S. Application Data

(63) Continuation of application No. 17/321,026, filed on May 14, 2021, now Pat. No. 11,657,106.

(30) Foreign Application Priority Data

May 15, 2020    (GB) ..................................... 2007214

(51) Int. Cl.
   *G06F 16/9537*        (2019.01)
   *H04L 41/0604*        (2022.01)
   (Continued)

(52) U.S. Cl.
   CPC ...... *G06F 16/9537* (2019.01); *H04L 41/0618* (2013.01); *H04L 41/065* (2013.01);
   (Continued)

(58) Field of Classification Search
   CPC ............ G06F 16/9537; H04L 41/0618; H04L 41/065; H04L 41/0654; H04L 41/5032;
   (Continued)

(56) References Cited

U.S. PATENT DOCUMENTS

| | | | |
|---|---|---|---|
| 6,883,119 B1* | 4/2005 | Bette | H04L 41/06 714/48 |
| 7,415,434 B2* | 8/2008 | Adduci, Jr | G06Q 40/00 705/36 R |

(Continued)

FOREIGN PATENT DOCUMENTS

| | | |
|---|---|---|
| GB | 2546119 A | 7/2017 |
| GB | 2577758 A | 4/2020 |
| GB | 2593529 A | 9/2021 |

OTHER PUBLICATIONS

Examination Report under Section 18(3) for GB Application No. GB2007214.6 mailed Nov. 29, 2021, 9 pages.

(Continued)

*Primary Examiner* — Richard G Keehn
(74) *Attorney, Agent, or Firm* — Aikin & Gallant, LLP

(57) ABSTRACT

A first aspect of the invention provides a method of fault monitoring in a utility supply network, the method comprising: receiving user queries, each user query about a performance of the network at a respective location; defining a region based on the locations specified in the received user queries; determining an estimate of a user population in the region; and according the region, based on the estimate, a priority for one or more of fault investigation and remediation.

17 Claims, 3 Drawing Sheets

(51) Int. Cl.
*H04L 41/0631* (2022.01)
*H04L 41/0654* (2022.01)
*H04L 41/50* (2022.01)
*H04L 41/5067* (2022.01)
*H04L 41/5074* (2022.01)
*H04L 43/04* (2022.01)
*H04L 43/067* (2022.01)
*H04L 43/50* (2022.01)
*H04W 4/02* (2018.01)

(52) U.S. Cl.
CPC ...... *H04L 41/0654* (2013.01); *H04L 41/5032* (2013.01); *H04L 41/5067* (2013.01); *H04L 41/5074* (2013.01); *H04L 43/04* (2013.01); *H04L 43/067* (2013.01); *H04L 43/50* (2013.01); *H04W 4/02* (2013.01)

(58) Field of Classification Search
CPC . H04L 41/5067; H04L 41/5074; H04L 43/04; H04L 43/067; H04L 43/50; H04W 4/02
See application file for complete search history.

(56) References Cited

U.S. PATENT DOCUMENTS

| | | | |
|---|---|---|---|
| 10,390,238 B1* | 8/2019 | Igelnik | G06Q 10/06316 |
| 2017/0230272 A1* | 8/2017 | Blake | H04W 24/04 |
| 2017/0230850 A1* | 8/2017 | Blake | H04L 43/16 |
| 2018/0218584 A1* | 8/2018 | Grove | H04L 41/507 |
| 2020/0065628 A1* | 2/2020 | Olnick | G01R 21/133 |
| 2021/0217120 A1* | 7/2021 | Del Forn | G06F 40/279 |

OTHER PUBLICATIONS

Examination Report under Section 18(3) for United Kingdom Application No. 2007214.6 mailed Sep. 7, 2022, 7 pages.
Held; "Dictionary of Communications Technology"; 1995; Pages; Cover, Copyright and definition p. 106 (Year: 1995).
Patents Act 1977: Search Report under Section 17 for Application No. GB2007214.5 dated Feb. 10, 2021, 11 pages.
Non-Final Rejection Mailed on Oct. 31, 2023 for U.S. Appl. No. 18/302,523, 24 page(s).

* cited by examiner

FAULT MONITORING IN A UTILITY SUPPLY NETWORK

CROSS REFERENCE TO RELATED APPLICATIONS

The present application is a continuation of U.S. patent application Ser. No. 17/321,026, filed May 14, 2021, entitled "FAULT MONITORING IN A UTILITY SUPPLY NETWORK," which claims the priority benefit of United Kingdom Patent Application No. GB 2007214.6, filed May 15, 2020, entitled "FAULT MONITORING IN A UTILITY SUPPLY NETWORK," which are incorporated by reference herein in their entirety.

FIELD OF THE INVENTION

The present invention relates to a method, system and computer program of fault monitoring in a utility supply network.

BACKGROUND OF THE INVENTION

Many types of utility supply network exist, for example for the delivery of potable water, electricity, gas, broadband, cable television, fixed-line telecommunications and cellular telecommunications. Operators of such networks have to ensure adequate operation and guard against the impact of faults and failures, and this is potentially challenging. Consider now the challenges that arise in the context of a cellular telecommunications scenario.

A network operator will typically have a large number (hundreds or thousands) of alarms and other forms of fault report evident on their network at any given point in time. Some of these alarms will be trivial and indicate a state which is operationally acceptable, but perhaps requires attention at the next planned maintenance visit. Examples of this might be a base-station mast-head power amplifier which is running hotter than it ordinarily should, or an RNC cabinet temperature which is higher than normal. Most alarms, however, indicate some form of 'failure', for example a lower radio-frequency power output from a base-station than should be produced based upon its operational state (e.g., number and range-distribution of users) or a complete shutdown of a site.

Still other faults may exist which do not result in an alarm being communicated to an operator. This may occur, for example, if a weather event causes an antenna system to change its pointing angle, thereby reducing or removing coverage from some users (at least some of whom would then undertake a status check to try and find out if there is a known problem).

A network operator does not typically have the resources necessary to inspect, diagnose and repair all of these faults, or even a majority of them, and most networks have to 'live' with a tolerable degree of 'failure' at any given point in time. The operator therefore has to decide how best to deploy their maintenance resources whilst achieving the greatest level of satisfaction from the network customers (the users).

At present, this may be achieved by ranking the sites exhibiting faults based upon which sites generate the most revenue. Similar metrics may also be used for other equipment, such as RNCs or transmission links—these will typically result in greater numbers of inconvenienced users as they may well serve multiple sites (resulting in more status checks from those users); this is likely to put them at, or close to, the top of the maintenance ranking.

Whilst this method works, to a degree, it makes assumptions about the numbers of users impacted and, crucially, about the user's perception of the failure. Taking an extreme example, if a base transceiver station (BTS) had failed and other, nearby BTSs then took over serving the affected users and all of the users were only sending occasional text messages (and doing nothing else), then those users would probably notice little or no difference to their service. The local BTS which had failed, however, might still appear as a high priority to repair, perhaps due to the type of alarm generated. In reality, even if the site wasn't repaired for days or weeks, these (text-message-only) users would not notice and nor would they be dissatisfied customers. Conversely, a failed site with fewer but (say) heavy data users, would lead to many more complaints and a very dissatisfied user base. A sensible approach would be to rank the repair of the latter site higher than that of the former, but the aforementioned method would likely not do this.

An alternative approach would be to rank failed sites (or other network components or equipment alarms) according to how many users undertook a 'status check', e.g., used an app on their phone, or a web-site, in order to check if there were known service problems at their location. Such checks are an indication of user dissatisfaction with the service they are receiving, as users rarely make such checks if they are receiving a good service. Whilst this mechanism may appear to solve the above ranking problem, there are a number of issues with it:

1) Users may be suffering congestion on the network which is unrelated to equipment failure, but will still undertake status checks;
2) Users may have experienced a small drop in performance, due to a failure in a local piece of network equipment, but are not suffering unduly. For example they may be experiencing a reduced, but still reasonable, data rate. Such users may well still undertake a status check, but would not be as unhappy as other users, elsewhere on the network, who had suffered a dramatic drop in data rate—the latter should obviously have a higher-priority from a maintenance perspective;
3) Specific types of user may be suffering problems, whereas other users may be unaffected. For example heavy data users and gaming users would suffer if a latency-related problem occurred, whereas lighter data users and voice or text users would probably not notice a problem at all. Whether this situation constitutes a high priority may be an operator-specific question, however, at the very least, diagnostic data would be useful, here, in order to determine why these users were unhappy;
4) At present, there is a degree of skepticism, on the part of network operators, regarding whether a rising trend of status checks in relation to a particular site or area are a valid indication of a problem in that area of a network. This skepticism derives largely from a lack of experience, by the operators, of this relatively new technology.

A problem with using this status-check based approach in isolation is that the availability of means for making a check (e.g., penetration of an 'app' which allows status checks to be made) may be poor and hence the number of impacted users may be difficult to judge. For example, a simple scaling of the number of status checks by app penetration statistics (e.g., if 1% of customers have the app, then multiply the number of status checks by 100 to give an indication of the number of impacted users) is potentially very inaccurate, especially with very low app penetration levels (which is typical, at present).

SUMMARY OF THE INVENTION

A first aspect of the invention provides a method of fault monitoring in a utility supply network, the method comprising: receiving user queries, each user query about a performance of the network at a respective location; defining a region based on the locations specified in the received user queries; determining an estimate of a user population in the region; and according the region, based on the estimate, a priority for one or more of fault investigation and remediation.

The respective location may be the location of the user device, or it may be a different location that is specified in the user query.

Determining an estimate of a user population in the region may comprise: determining an estimate of a total population within the region; and determining the estimate of the user population based on the estimate of the total population within the region and an estimate of the proportion of the total population that are users. The proportion of the total population that are users (i.e., the market penetration) may be a local market penetration or a more general, national market penetration. Determining an estimate of a user population in the region may involve multiplying the estimate of the total population within the region by a user factor, which is indicative of the proportion of the population that are network users. The user factor is a number in the inclusive range 0-1.

Determining an estimate of a total population within the region may comprise assessing the fraction of a geographical area that falls within the region and counting that fraction of a population estimate of the geographical area towards the estimate of the total population estimate within the region. The geographical area and its population estimate may be specified in a population map or in a database (which may be off the shelf or bespoke).

Determining an estimate of a user population in the region may comprise accounting for temporal variation of the population in the region. Accounting for the temporal variation of the population in the region may include accounting for one or more of: the time of day (such as whether it is day or night); the day of the week (such as whether it is a weekday or weekend); and the date (such as whether it is a public holiday). Temporal variation of the population in the region may occur in particular in regions such as business districts or transport hubs.

The priority may be an absolute, predetermined priority level.

The priority may be relative to a further priority accorded to a further region.

The priority may additionally be based on one or more of: the number of user queries corresponding to the region in a given time period; the typical or estimated revenue generated by the network in the region; a presence of an important person in the region (such as a celebrity or social media influencer); whether or not there is a previously-identified issue affecting the region; whether the region is considered one of the most popular sites in the network; and a presence of an important location within the region (such as media headquarters or a national landmark).

The network may be a communications network.

The user queries may be user reports of dissatisfaction of performance of the network. The user queries may be triggered by curiosity about an unexpected change in the performance of the network.

The user queries may come from users of the network, via one or more of: the users' electronic devices; a web-page; and a customer call centre.

The user queries may be collected in a rolling time period. The rolling time period may be four hours, for example.

The method may comprise the further step of reporting a status of fault investigation and remediation to affected users. The status of fault investigation and remediation may be based on the priority level.

A further aspect of the invention provides a computer program, which when executed by processing means, performs the method of the first aspect.

Yet a further aspect of the invention provides a system with data processing resources and memory, configured to perform the method of the first aspect.

BRIEF DESCRIPTION OF THE DRAWINGS

By way of example only, some embodiments of the invention will now be described with reference to the accompanying drawings, in which.

DETAILED DESCRIPTION OF EMBODIMENT(S)

Figure 1:
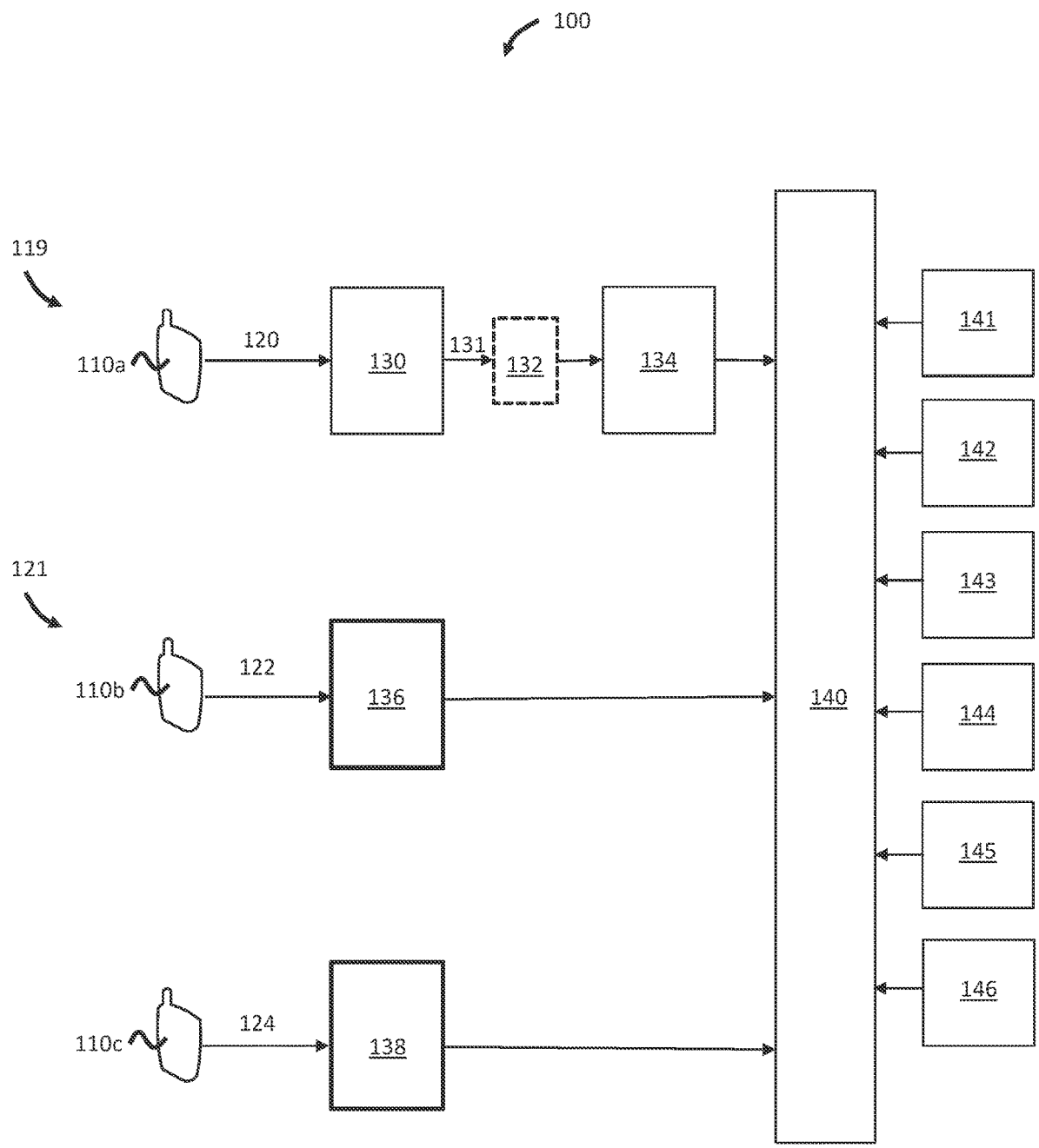
FIG. 1 shows a network receiving objective and subjective data.

FIG. 1 illustrates a system 100 for collecting performance data about a 4G cellular telecoms network for use in diagnosing faults in the 4G network. The performance data includes subjective data 124 and objective data 120, 122:

Subjective data 124 is performance data related to the user's perceived performance of the 4G network and is derived from user reports of issues with the 4G network. The subjective data 124 may include status checks by the user and other user-reported metrics.

Objective data 120, 122 is performance data derived from measurements from mobile devices 110a belonging to the users reporting issues with the 4G network as well as measurements from mobile devices 110b belonging to other users nearby (to help distinguish between faults caused by a mobile device 110a, 110b from faults caused by a fault in the 4G network). Objective data 120, 122 may include measurements taken by a mobile device 110a, 110b of the service quality it is experiencing (for example, received signal strength, transmitter output power, received and transmitted data rates, latency, voice quality, bit error rate, signal-to-interference, noise and distortion (SINAD) and any other metric which the mobile device 110a, 110b is capable of reporting).

The performance data (subjective data 124 and objective data 120, 122) is stored in database 140 to build up a body of historical performance data which can be used in the diagnosis of future network faults. As the causes and impact of network faults are identified, these can be stored alongside the associated historical performance data in the database 140.

The current network performance data is then compared against comparable historic data in the database 140 in order to diagnose the cause of a fault in the 4G network, based on what was identified to be the cause of the fault in the comparable historic data. In effect, the network fault diagnosis tool assesses whether similar network circumstances have occurred in the past, such as a similar level and distribution of affected users (as evidenced by the subjective data 124 such as status check requests) and similar network performance conditions (based on objective data 120, 122 measured from the mobile devices 110*a* belonging to the user reporting issues as well as measurements from other nearby mobile devices 110*b*), and optionally based upon a similar type of area (such as urban, suburban, rural, indoor, outdoor, etc.).

The network fault diagnosis tool is able to learn from the outcomes it proposes by comparing its proposal with the true cause of the fault entered into the database 140 after definitive diagnosis by a 4G network engineer.

Further details of the nature of the subjective and objective performance data will now be discussed with reference to FIG. 1.

Subjective Data

Subjective data 124 is user-generated data on the status or performance of the network perceived by the user of a mobile device 110*c*. Such subjective data 124 may be generated in a number of different ways, including:

Status checks—these are checks made by the user, typically using an app on their mobile device 110*c* that has been provided for the purpose by the network operator (the app typically has many other functions as well, such as providing the ability to access the user's bill, usage to date, coverage maps etc.). The user will typically undertake a status check when they are experiencing a problem with the 4G network or when they are receiving a poorer service than they might expect. A status check typically involves pressing a virtual button in the app on the touch-screen of the mobile device 110*c* which sends a message to the network operator asking if there is any known problem on the 4G network local to the user. If there is a known problem, an explanatory message will typically be sent to the user's mobile device 110*c* in response, acknowledging that there is a problem and perhaps indicating the nature of the problem and when it will be rectified. A status check can also be undertaken in a similar way using a web browser pointed to the operator's website.

Feedback reports—these can either be reports voluntarily submitted by the user (for example, via the network operator's website) which are essentially complaints about the service the user is receiving, or reports elicited by the network operator sending out a survey to selected users. Such surveys could, for example, be targeted at users in an area where it is possible that a problem exists—where other local users have undertaken status checks, for example—and the network operator wants to understand other users' experiences.

Notification subscriptions—users can subscribe to notifications relating to when a network repair will be completed. A large number of such subscriptions (in a given area) could indicate that a large number of users are very unhappy about the service (or the lack of service) that they are currently receiving and are keen to know the moment it is restored to normal.

Calls to a call centre—users may call a customer service call centre to ask about the status of the network in their local area and to report problems with their service. A large number of calls from a particular area could indicate that there is a problem in that area.

There are, of course, many other possible ways in which a user could communicate their subjective view of the network (for example, via social media, either involving the operator or just complaining generally). It should be emphasised that all of the above reports (from users) are subjective—they relate to the user's perception of the network—and do not necessarily indicate that a fault exists, simply that the network, for whatever reason, does not meet the expectations of that particular user, in that particular location, at that particular time. Clearly, however, a large number of such reports, in a given area, at a given time, are potentially indicative of a network problem, even if that problem is simply 'congestion'.

The subjective data 124 is collected by subjective data server 138. The subjective data 124 may be collected automatically (for example, from status checks performed on an app or website, or electronic feedback reports) or manually entered (for example, following a call with a call centre, the operator may manually enter the subjective data 124 into the subjective data server 138). The subjective data server 138 processes the subjective data 124 into a format suitable for database 140, before loading the subjective data 124 onto the database 140 where it is associated with an anonymised device identifier for the particular mobile device 110*c*, to allow the subjective data to later be associated with other relevant performance data for the particular mobile device 110*c*, such as the objective measurement data discussed below.

Objective Data

FIG. 1 illustrates two methods for collecting objective data: batch-data collection 119 and live-data collection 121.

Batch-Data Collection

Batch-data collection 119 periodically (typically hourly) collects measurement data 120 from all mobile devices 110*a* connected to the 4G network at measurements collection server 130. Given the need to collect measurement data 120 from all mobile devices 110*a* connected to the 4G network, batch-data collection 119 is designed to handle very large volumes of data. For example, although measurement data 120 is typically collected from each mobile device 110*a* every hour, the exact collection times from each individual mobile device 110*a* may be randomly staggered to ensure that not all mobile devices 110*a* are trying to send their measurement data 120 simultaneously.

The measurement data 120 comprises measurements taken by a mobile device 110*a* of the network service quality it is experiencing (for example, received signal strength, transmitter output power, received and transmitted data rates, latency, voice quality, bit error rate, signal-to-interference, noise and distortion—SINAD—and any other metric which the mobile device 110*a* is capable of reporting).

Measurements collection server 130 generates a measurement report data file 131 for each set of measurement data from a mobile device 110*a*. The measurement report data file 131 contains the measurement data 120 with a timestamp at which the measurement data 120 was collected and an identifier associated with the mobile device 110*a* (which is typically an anonymised version of the identifier provided by the mobile device 110*a* to protect user privacy).

The measurement collection server 130 typically adds each measurement report data file 131 to a data queue 132 to await processing by the measurements batch processor 134.

The measurements batch processor 134 takes the measurement report data files 131 from the data queue 132 and essentially provides a translating/transformation process, converting the measurement report data files 131 and the data within them into the correct format to be stored in the database 140.

The data leaving the measurements batch processor 134 to enter the database 140 typically contains the following:
1) Anonymised identification—the user device from which the data originated is discarded and an anonymous (random) identity is attached. This allows the data from a mobile device 110*a* to be assessed over time without (potentially) infringing the privacy of the user of the mobile device 110*a*. Anyone interrogating the database 140 would be unable to identify the mobile device 110*a* or its user, only that measurements have come from the same mobile device 110*a* or user.
2) A randomised identifier for the measurement report itself, to allow duplicates to be recognised and eliminated.
3) A location identifier indicating the network area in which the mobile device 110*a* was operating at the time the measurements were taken.
4) The location of the BTS which was serving the mobile device 110*a* at the time the measurements were taken.
5) The (compass) bearing of the mobile device 110*a* from that cell site.
6) The approximate distance of the mobile device 110*a* from the cell site's location.

The measurements batch processor 134 typically runs periodically (hence the requirement for the data queue 132), with an interval between initiating each run being typically being around five minutes.

Although only a single measurement collection server 130 is shown in FIG. 1, it is possible to have multiple measurement collection servers 130, each feeding one or more batch processors 134.

Live-Data Collection

Live-data collection 121 collects live measurement data 122 from a mobile device 110*b* of the network service quality it is experiencing at that point in time (for example, received signal strength, transmitter output power, received and transmitted data rates, latency, voice quality, bit error rate, signal-to-interference, noise and distortion—SINAD—and any other metric which the mobile device 110*b* is capable of reporting).

Live data collection 121 is triggered in response to the generation of subjective data 124. For example, the occurrence of a user performing a status check from their mobile device 110*b*, 110*c* triggers their mobile device 110*b*, 110*c* to obtain live measurement data 122.

Live measurement data 122 may also be requested, by a live data server 136, from other mobile devices 110*b* which have not initiated a status check, but which happen to be local to an area of interest, either based for example upon the number of status checks in that area or upon a specific operator interest (such as a stadium during an event). In both cases, the trigger for the collection of live measurement data 122 is subjective, i.e., a network user is, in their opinion, experiencing a poor or degraded level of service relative to that which they have experienced in the past or would reasonably expect to receive. This is inherently subjective, as different users will have differing opinions (or thresholds) as to what constitutes 'poor' or 'degraded'. Collecting live measurement data 122 from other mobile devices 110*b* may aid in determining whether the issue which caused a user to initiate a status check is unique to that user (meaning that it may well be a problem with his/her mobile device 110*b*) or more general to the area (and if so, ascertain how widespread the issue might be). A more general experience of the problem (e.g., a low data rate) may well indicate that there is an issue with the 4G network in that area.

Other triggers may also initiate live data collection 121, such as submitting web-based status requests or complaints. In this case, live measurement data 122 data may be collected from nearby mobile devices 110*b* while a subset of this live measurement data (such as network speed) may be collected from the user or users. It is also possible to infer the identity of the connection type of the web-based user (i.e., Wi-Fi or cellular). In the case of a cellular connection, the network speed will indicate the user's network experience. If the user is connected over Wi-Fi, this may indicate that there is a catastrophic issue with the cellular network in that area (since the user needs to resort to Wi-Fi to request a status check). Measurement data from web-based users can be filtered out (and not used in subsequent fault analysis, for example) if the user is identified as not using the network operator's network when making the status check or not using it in the location about which the status check or coverage query is made.

Live data collection 121 typically comprises fewer servers (perhaps one-tenth of the number involved in batch-data collection 119), since far less live measurement data 122 is collected (or needs to be collected) than batch measurement data 120—live measurement data 122 only needs to be collected in response to a user-initiated status check and there are few of these relative to the number of mobile devices 110*b* active on the 4G network at a given point in time. Essentially, live measurement data 122 is only uploaded when it is interesting to do so—that is, there is an immediate reason to do so, and this uploading is undertaken immediately.

The live data server 136 enters the live measurement data 122 into the database 140 along with:
1) Anonymised identification—the identity of the mobile device 110*b* from which the live measurement data 122 originated is discarded and an alternative anonymous identity is attached. This allows the live measurement data 122 from a particular mobile device 110*b* to be assessed over time without (potentially) infringing the privacy of the user of the mobile device 110*b*. Anyone interrogating the database 140 would be unable to identify the mobile device 110*b* or its user, only that measurements have come from the same mobile device 110*b* or user.
2) An alternative identifier for the live measurement data 122, to allow duplicates to be recognised and eliminated.
3) A location identifier indicating the network area in which the mobile device 110*b* was operating at the time the measurements were taken.
4) The location of the cell site which was serving the mobile device 110*b* at the time the measurements were taken.
5) The (compass) bearing of the mobile device 110*b* from that cell site.
6) The approximate distance of the mobile device 110*b* from the cell site's location.

Database 140

The database 140 stores all of the measurement data (batch or live) in the form of records or tuples, within tables, in its structure. The database is typically an off-the-shelf product (such as Oracle®, Postgres® and the like) which is configured for this specific application (i.e., that of storing, and allowing access to, data collected from individual mobile devices 110*a-c*). It can be accessed by the network operator directly or by other systems owned, managed or used by the network operator.

The database may also store data from a range of other pertinent data sources to aid in fault diagnosis, such as:

1) Data 141 relating to network change requests (requests for changes to the network configuration, such as the position or pointing angle of one or more antennas, the installation or de-commissioning of a base-station, etc.) and/or planned maintenance operations. This can help to inform decisions regarding whether a network change may be the root cause of an increase in the number of status checks locally to the change or if they may simply be as a result of a planned local outage in the network for maintenance or upgrade purposes.

2) Data 142 relating to 'trouble tickets' and/or known incidents on the network. These are incidents or problems of which the network operator is already aware and which may or may not be being dealt with already. Such information can be communicated to the users (e.g., in response to a status check), as appropriate.

3) Data 143 relating to network configuration information, such as cell-site locations, RNC/BSC parents and connectivity, antenna pointing angles, transmit power levels, etc. This information can be used, for example, to determine from which nearby user devices measurement data should be requested, in the event of one or more local users initiating a status check.

4) Data 144 relating to network alarms. This can be used to correlate status checks and (poor) measurement data with known alarm conditions and, potentially, thereby raise their status within the maintenance hierarchy.

5) Data 145 relating to network performance characteristics, such as the amount of traffic being handled by each cell and the availability of each cell.

6) Data 146 from a network planning tool, including the designed network topology (which may not necessarily exactly match the network as deployed). This database will contain coverage maps and coverage predictions and may be used to assess whether the reported issue stems simply from the fact that the user is outside of the designed network coverage area.

Data 145 and 146 provide the basis for a root-cause analysis to be undertaken, in order to identify the location (within the network hierarchy) of the faulty element.

Combining Subjective Data and Objective Data

Since data in the database 140 is associated with an (anonymised) identifier for each mobile device 110*a-c*, subjective data based on status checks and other information provided by the user of the mobile device 110*c* can be associated with objective data (batch and/or live measurement data) from the same mobile device 110*a*, 110*b*.

For example, if a user requests a status check from the network operator's app running on mobile device A, data relating to the status check will be stored on the database 140 with an anonymised identifier associated with mobile device A. Simultaneously, or soon after, live measurement data 122 will be requested from mobile device A, either by the live data server 136 or the app itself, and this live measurement data 122 will also be assigned to the anonymised identifier associated with mobile device A.

In this way, the subjective and objective data may be combined when the database is queried to form a richer and more powerful resource to assist the network operator in identifying and diagnosing faults.

Each of the blocks of FIG. 1 could be implemented by a physically separate piece of hardware (such as a computer, server, hard disk storage unit or other item of electronic hardware), or some functions could be combined into a single piece of hardware (e.g., the measurement collection server 130, data queue 132 and measurements batch processor 134 could be integrated into a single block). It is also possible that some or all of these hardware items could be virtualized and be assigned to disparate hardware elements deployed by a third-party service provider, such as a cloud computing services provider. In this case, a 'server' could actually be a virtual server, with tasks executed and spread across a number of physical hardware devices, potentially in different physical locations. In all of these physical hardware configurations, however, the main elements shown will be present, either physically/individually, or in varying degrees of virtualisation.

The system of FIG. 1 has the ability to scale as needed, that is, it is straightforward to add more computing resources as required, depending upon the volume of reports it is receiving. This may well increase over time as more customers are encouraged to sign-up to use the operator's service-reporting/billing app. The system could be implemented on a cloud computing platform to facilitate scaling.

Fault Monitoring and Prioritising Using Subjective Data

The performance data (specifically the subjective data 124) collected by the system of FIG. 1 and stored in the database 140 over time can be used in monitoring and prioritising faults in the 4G network.

Figure 2:
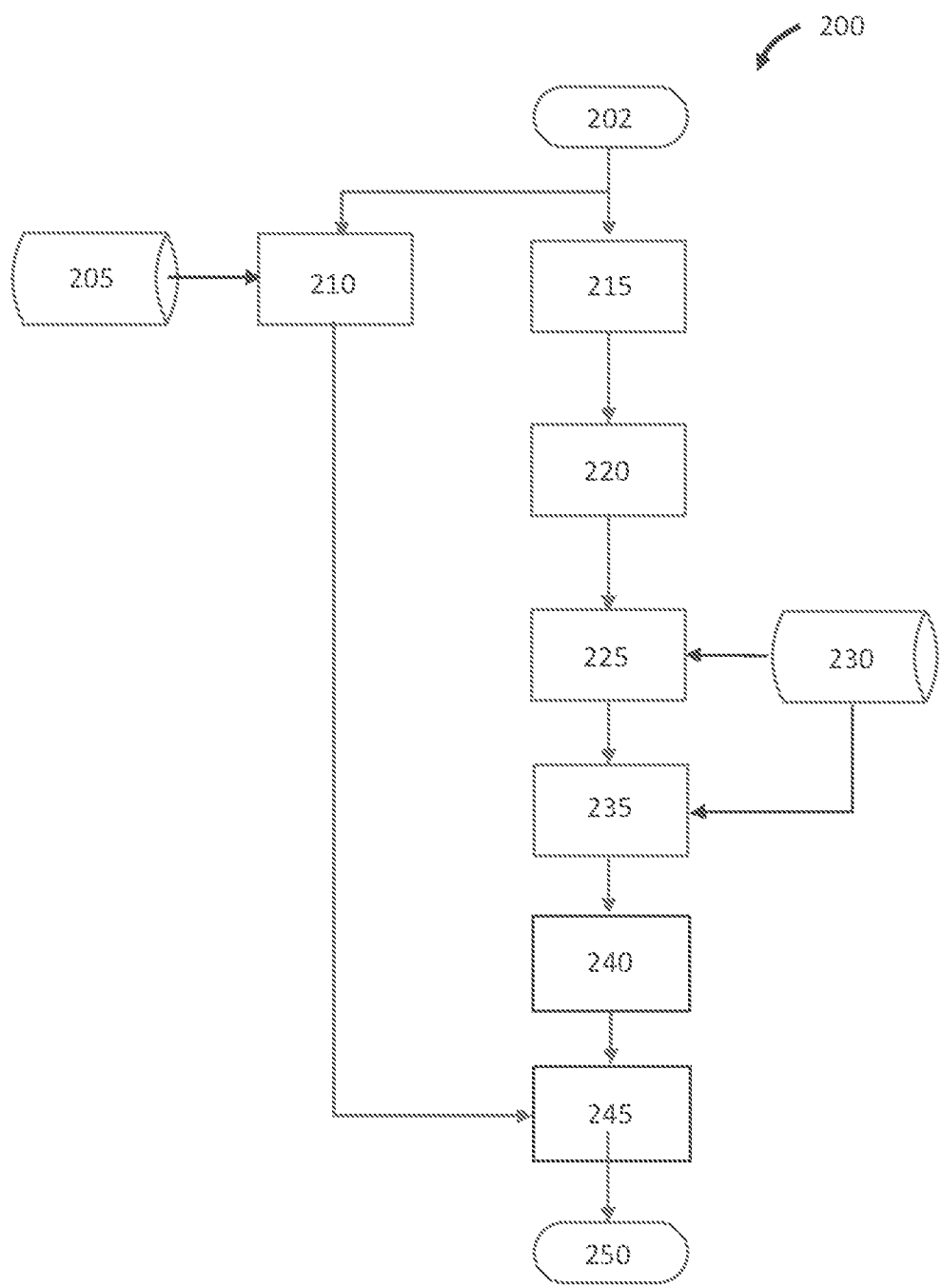
FIG. 2 shows a flow chart for a fault examination algorithm.

The manner in which this is performed is shown in FIG. 2 at step 200.

The method begins at step 202. At step 210, the database 140 receives a number of trouble-tickets from a trouble-tickets database 205. The trouble-tickets include alarms, possible fault locations, maintenance tasks and known/planned outages.

Simultaneously, the database 140 receives a number of user queries in step 215. Each of the user queries are sent from a user device or in another way, such as by web page submission. The user queries are subjective data, and could comprise any of the forms of subjective data discussed above, including status checks, feedback reports, notification subscriptions and calls to a call centre. Each user query relates to the performance of the network at a respective location. In other words, each user query indicates a possible problem at a respective location that is associated with the user query.

At step 220 one or more suspect regions are defined based on the user queries. Specifically the number of user queries and the distribution of the respective locations are used to define the one or more suspect regions. In particular, the density of the respective locations on a map is used to define the one or more suspect regions. The user queries are typically considered in a defined period, for example a four hour rolling period, i.e., only user queries arising within the previous defined period (for example, the past four hours) are considered and used to define the one or more suspect regions. When considering the 4G network as whole, it is very likely that subjective reports will be received from disparate geographic regions and that a number of "clusters" may then be formed in different parts of the operator's network coverage area. Each of these clusters will typically be delineated by a closed boundary, each boundary defining a respective suspect region, each suspect region indicating the possible (or perhaps likely) presence of a fault. For each suspect region, the coordinates specifying the path of the boundary defining the region are, to whatever resolution is appropriate for the shape of the boundary (which may be amorphous or regular), calculated in step 220. Examples of methods for identifying suspect regions are disclosed in GB2546119.

Using a population-density database 230, a population figure is obtained for the or each suspect region identified in step 225. The population-density database 230 is a map of the country or territory that encompasses the region and which is divided into a grid of 1 km×1 km squares for each of which a population figure is provided. The population-density database 230 is typically a third-party database to which access has been purchased by the network operator. The squares need not be 1 km×1 km in size. Also, the map could be composed of a patchwork of one or more shapes that are other than square.

In step 235, for the or each suspect region, the population is calculated using the population-density database 230. The calculation of the population of a suspect region will now be explained with reference to FIG. 3.

Figure 3:
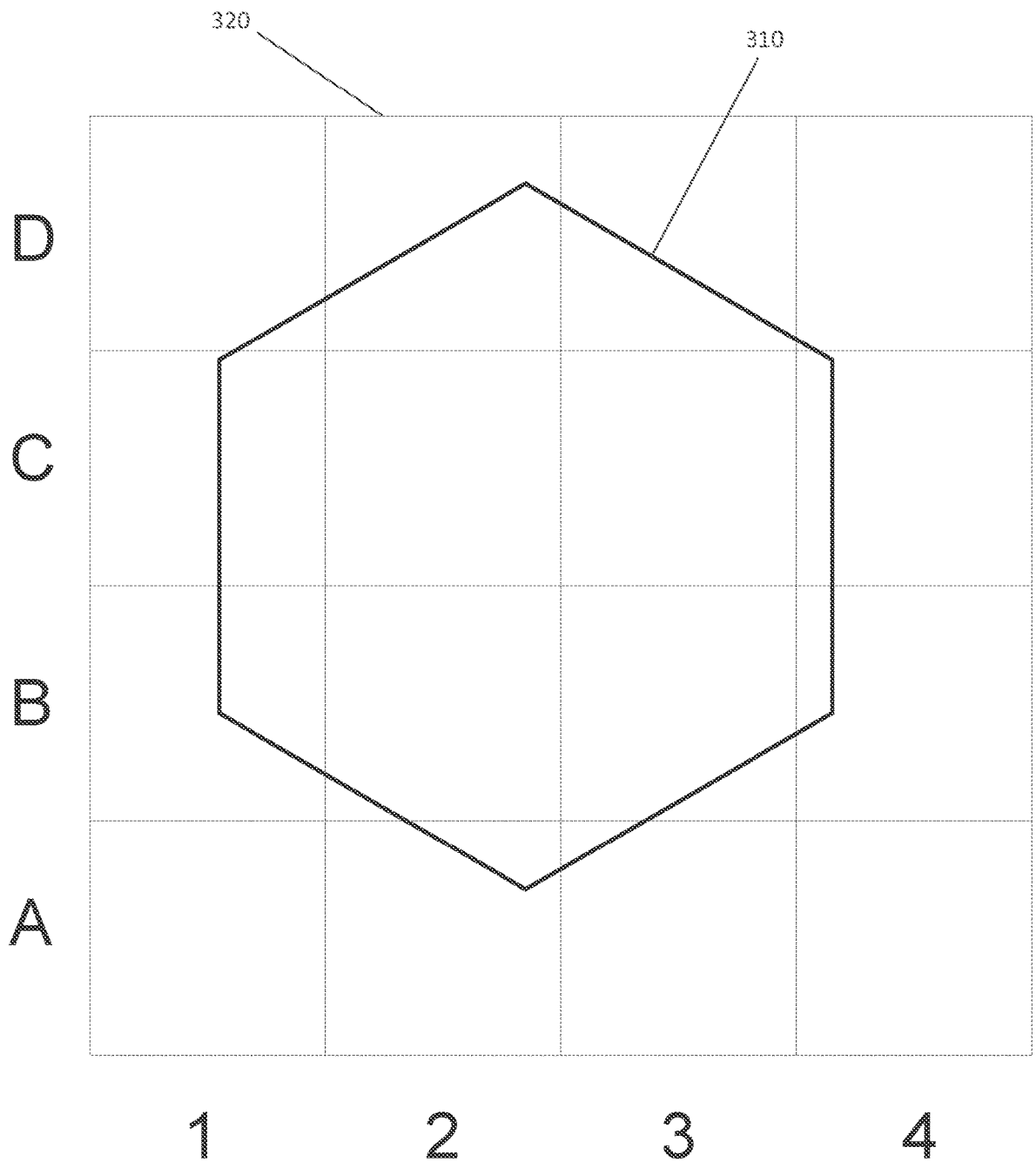
FIG. 3 shows a way of estimating the population within a defined region.

FIG. 3 shows a suspect region 310 which, in this example, is a hexagon. The suspect region 310 is aligned or registered with the map of the population-density database 230. The population of the squares of the map that fall entirely within the suspect region 310 are counted towards the population of the suspect region. For any square that straddles the boundary of the suspect region 310, the fraction of the area of the square that falls within the boundary is estimated, and that fraction of the square's population is then counted towards the population of the suspect region 310. By processing in this way all the squares that fall at least partially within the boundary, a total population estimate can be arrived at for the suspect region 310. For example, in order to calculate the total population within the region 310, the squares of the grid 320 may be considered as follows. Squares C2 and C3 fall completely within the region 310, and so their populations can be counted entirely. Squares A1 and A4 fall completely outside the region 310, and so their populations will not be counted at all. Square C1 falls partly within the region 310, and so a proportionate percentage of C1's population may be counted towards the population of the region 310. About 40% of C1 is within the region 310, so 40% of the population within C1 may be counted towards the population of the region 310. A similar approach, taking into account the proportion of the square that is covered by the region 310, is used for all of the squares that are partially covered by the region 310, i.e., D1, D2, D3, D4, C1, C4, B1, B2, B3, B4, A2 and A3. The sum of the populations calculated for each square as described above gives an estimate for the total population in the region 310.

This total population estimate may be applied with a time-dependent factor to account for the transitory nature of the population within the area in question. For example, if the region is a business district or a transport hub, its population is likely to be greater during the daytime on weekdays, compared to other times and days. The time-dependent factor may be taken from a memory that includes the value of the time-dependent factor depending on the time and/or day.

After calculating an estimate of the total population within the or each suspect region, an estimate of the user population within the or each suspect region is determined in step 240. In other words, the population figure of the or each suspect region is reduced, proportionately, to take into account the fact that a given network operator is unlikely to have a 100% market penetration of the local (or national) population. In this step, the population estimate of the or each suspect region is multiplied by a user factor indicative of the user population in the region. For example, if the network operator has a 30% market penetration in a suspect region, the total population arrived at for that region will be multiplied by a user factor of 0.3 in order to arrive at a user population for that region.

As stated above, each suspect region is likely to correspond to a fault. Once the user population for a suspect region has been calculated, this gives an indication of the number of users likely to be affected by the potential or assumed fault in that region. At step 245, the or each suspect region is accorded a priority for one or more of fault investigation and remediation, based on the calculated number of users likely to be affected by the fault. The method terminates at step 250, but will be re-run regularly.

In the likely scenario in which a network operator is facing a number of faults (actual or potential), suspect regions can be accorded respective priorities using the method described above with reference to FIGS. 2 and 3. The priorities of the suspect regions may then be compared to one another, and the suspect regions ranked by priority value in order to determine the order in which suspect regions should receive attention (typically in the form of fault investigation and remediation). In other words, an issue that has less serious effects on users' network capabilities but affects a high number of users may be given a higher priority for fault investigation and remediation than an issue that has more serious effects on users but is only affecting a few users.

It is noted that if the network operator has an approximately equal market penetration across the country, then it may be acceptable to forego the scaling of the population values of suspect regions according to market penetration percentages.

In addition to the ranking of investigation and maintenance tasks, the method of FIGS. 2 and 3 may also connect to a user-feedback provisioning system. Such a system may provide users with information regarding the issues they are experiencing, such as one or more of the following: the fact that a fault has been identified and is undergoing investigation and/or remediation; an explanation of what the fault is; and a time estimate for when the fault will be fixed. The user feedback may be provided responsive to a user query, or more preferably, an appropriate user message will be provided to every potentially affected user in the region. These user messages are tailored based upon the priority assigned to the fault. For example, if the fault is given a high priority, the message sent to users of the network may include statements indicating that the fault is known, has been diagnosed and will be repaired by a specified time. If, on the other hand, the incident is assigned a low priority, then the message may reflect this by indicating that a possible fault is under investigation and that further updates will be provided in due course—for example, a message reassuring users that work of some sort is underway, but setting their expectations at a lower level regarding when a resolution to the problem might be forthcoming.

It is possible to apply the invention described above to a range of communications systems in which a large number of disparate users rely upon a smaller number of communications "nodes" in order receive, amalgamate, route or otherwise process and forward communications traffic. In the above, cellular case, the nodes could be BTS or cell sites, for example.

In this vein, it is possible to apply the invention to a fixed-line data network, such as a 'broadband' internet network (e.g., using DSL or fibre optics or similar). In such a case, the 'nodes' could be roadside cabinets containing switching or routing equipment or any other equipment which serves a number of users in a given locality. For example, a group of users connected to the same roadside cabinet and who were experiencing poor service, could perform a service check (e.g., using a device connected to a cellular data service) and obtain an appropriate response to a query about their fixed-line service. In this case, poor service could include a poor data speed in the upload direction, the download direction, or both, or it could represent a complete service failure. Again the service checks could be analysed in order to assess whether only a single user is experiencing difficulties, in which case the problem could lie with his/her customer premises equipment (CPE), or whether many users connected to a common point are experiencing difficulties, in which case there is likely to be a fault (or severe congestion) centred on that common point (e.g., street cabinet).

Although the invention has been described above with reference to one or more preferred embodiments, it will be appreciated that various changes or modifications may be made without departing from the scope of the invention as defined in the appended claims. In this connection, although the exemplary description has focused quite strongly on fault analysis within a 4G network, it should go without saying that the fault analysis techniques of the invention can be used in other kinds of cellular communications network or, indeed, in networks for the supply of other kinds of utility (gas supply, electricity supply, water supply, etc.).

The invention claimed is:

1. A method of fault monitoring in a utility network, the method comprising:
   receiving user queries via a network querying service, the network querying service being functionally equivalent to the utility network, each user query about a performance of the utility network experienced by the user at a respective location;
   defining a region based on the locations specified in the received user queries;
   determining an estimate of a user population in the region; and
   determining for the region, based on the estimate, a priority for one or more of fault investigation and remediation.

2. The method of claim 1 wherein determining an estimate of a user population in the region comprises:
   determining an estimate of a total population within the region; and
   determining the estimate of the user population based on the estimate of the total population within the region and an estimate of the proportion of the total population that are users.

3. The method of claim 2 wherein determining an estimate of a total population within the region comprises
   assessing the fraction of a geographical area that falls within the region and counting that fraction of a population estimate of the geographical area towards the estimate of the total population estimate within the region, and wherein the geographical area and its population estimate are specified in one of a population map and a database.

4. The method of claim 1, wherein determining an estimate of a user population in the region comprises accounting for temporal variation of the population in the region.

5. The method of claim 1, wherein the priority is based on at least one of:
   the number of user queries corresponding to the region in a given time period;
   one of the typical or estimated revenue generated by the utility network in the region;
   a presence of an important person in the region;
   whether or not there is a previously-identified issue affecting the region;
   whether the region is one of the most popular regions in the utility network; and
   a presence of an important location within the region.

6. The method of claim 1, wherein the user queries are user reports of dissatisfaction with the performance of the utility network.

7. The method of claim 1, wherein the user queries come via one or more of:
   the users' electronic devices;
   a web-page; and
   a customer call center; and
   wherein the user queries are collected in a rolling time period.

8. The method of claim 1, further comprising
   reporting a status of fault investigation and remediation to affected users, wherein the status is based on the priority.

9. The method of claim 1, wherein the network querying service forms part of the utility network.

10. A method of fault monitoring in a communications system of a utility network, the method comprising:
    receiving user queries from users of a communications system associated with the utility network, each user query about a current performance of the communications system associated with the utility network at a respective location;
    defining a region based on the locations specified in the received user queries;
    determining an estimate of the user population in the region; and
    determining for the region, based on the estimate, a priority for one or more of fault investigation and remediation.

11. The method of claim 10 wherein determining an estimate of a user population in the region comprises:
    determining an estimate of a total population within the region; and
    determining the estimate of the user population based on the estimate of the total population within the region and an estimate of the proportion of the total population that are users.

12. The method of claim 11 wherein determining an estimate of a total population within the region comprises
    assessing the fraction of a geographical area that falls within the region and counting that fraction of a population estimate of the geographical area towards the estimate of the total population estimate within the region, and wherein the geographical area and its population estimate are specified in one of a population map and a database.

13. The method of claim 10, wherein determining an estimate of a user population in the region comprises accounting for temporal variation of the population in the region.

14. The method of claim 10, wherein the priority is based on at least one of:
    the number of user queries corresponding to the region in a given time period;
    one of the typical or estimated revenue generated by the utility network in the region;
    a presence of an important person in the region;

whether or not there is a previously-identified issue affecting the region;

whether the region is one of the most popular regions in the utility network; and a presence of an important location within the region.

15. The method of claim 10, wherein the user queries are user reports of dissatisfaction with the performance of the communications system of the utility network.

16. The method of claim 10, wherein the user queries come via one or more of:

the users' electronic devices;

a web-page; and a customer call center; and wherein the user queries are collected in a rolling time period.

17. The method of claim 10, further comprising reporting a status of fault investigation and remediation to affected users, wherein the status is based on the priority.

* * * * *